(12) United States Patent
Takahashi

(10) Patent No.: US 6,501,035 B2
(45) Date of Patent: Dec. 31, 2002

(54) SWITCHING UNIT FOR STEERING WHEEL IN MOTOR VEHICLE

(75) Inventor: Atsuo Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/838,481

(22) Filed: Apr. 19, 2001

(65) Prior Publication Data

US 2001/0037931 A1 Nov. 8, 2001

(30) Foreign Application Priority Data

Apr. 28, 2000 (JP) ........................................ 2000-130704

(51) Int. Cl.[7] ................................................ H01H 9/00
(52) U.S. Cl. .................................. 200/61.54; 200/61.57
(58) Field of Search ........................... 200/61.54–61.57, 200/159 R, 303, 293–307; 439/15

(56) References Cited

U.S. PATENT DOCUMENTS

| 4,447,684 A | * | 5/1984 | Sugiyama ................. 200/61.54 |
| 4,590,340 A | | 5/1986 | Koike et al. |
| 4,697,092 A | * | 9/1987 | Roggendorf et al. ...... 307/10 R |
| 5,152,358 A | * | 10/1992 | Kozuka ....................... 180/78 |
| 5,627,352 A | * | 5/1997 | Suzuki et al. ............ 200/61.54 |
| 5,721,541 A | | 2/1998 | Repp et al. |
| 5,739,491 A | * | 4/1998 | Crosson, Jr. ............. 200/61.54 |
| 5,855,144 A | * | 1/1999 | Parada ......................... 74/552 |
| 5,950,494 A | * | 9/1999 | Sugiyama ................. 74/484 H |
| 6,086,090 A | * | 7/2000 | Fischer ..................... 280/728.2 |
| 6,139,051 A | * | 10/2000 | Fujita ......................... 280/731 |
| 6,147,315 A | * | 11/2000 | Rudolph et al. ......... 200/61.54 |
| 6,312,012 B1 | * | 11/2001 | Bohn et al. ................. 280/731 |
| 6,349,616 B1 | * | 2/2002 | Onodera et al. ............. 74/552 |

* cited by examiner

Primary Examiner—Elvin Enad
Assistant Examiner—Lisa N Klaus
(74) Attorney, Agent, or Firm—Brinks Hofer Gilson & Lione

(57) ABSTRACT

The switching unit has the switching member on the front side and the switching member on the back side which are mutually mechanically and electrically connected when mounted on the spoke portion of the steering wheel, and is designed such that when the switching members are assembled in one unit, the elastic electrode portion on one side comes into elastic contact with the electrode pattern portion on the other side. The switching members, therefore, are not required to be assembled into one unit prior to installation on the steering wheel. In addition it is possible to dispense with such a complicated operation as electrically connecting the switching members by a wiring harness after installation to the steering wheel, therefore improving the ease of installation. Furthermore, since there is no necessity to form a through hole in the spoke portion of the steering wheel, the steering wheel will not be deteriorated in mechanical strength.

4 Claims, 3 Drawing Sheets

SWITCHING UNIT FOR STEERING WHEEL IN MOTOR VEHICLE

BACKGROUND OF THE INVENTION

1. Field of the Invention

This invention relates to a switching unit fixedly attached on a spoke portion of a steering wheel in a motor vehicle and, more particularly, to a switching unit for a steering wheel which is provided with a switching member on the front side and a switching member on the back side which are mutually integrated and electrically connected.

2. Description of Related Art

According to a conventional switching unit for a steering wheel, a switching member on the front side and a switching member on the back side are attached for mechanical integration on a specific bracket, and are electrically connected by wiring. The bracket of the integrated switching unit is fixedly attached to a core metal of the spoke portion of the steering wheel, so that the switching member on the front side may be mounted on the front side of the spoke portion and the switching member on the back side may be mounted on the back side of the spoke portion as viewed from the driver's seat of the motor vehicle.

As another example of conventional switching unit, there also has been proposed that the switching member on the front side and the switching member on the back side are separately secured on the core metal of the spoke portion of the steering wheel, then are electrically connected by a wiring harness.

The switching unit for the steering wheel is usable as a push-to-operate switch for performing up- and down-shifts during driving in DRIVE range, and also as a switch for controlling an air-conditioning system and a car phone, and furthermore as a horn switch.

In the former of the above-described conventional arts, the switching unit formed in advance by assembling the switching member on the front side and the switching member on the back side into one unit is securely attached on the spoke portion of the steering wheel. It is, therefore, necessary to attach these switching members to a bracket so formed as to make it possible to hold the core metal of the spoke portion. In this case, there is such a disadvantage as a lowered degree of design freedom because of the shape and size of each switching member. Furthermore, as a modification of the art, both switching members are integrally formed in the status that one of the switching members can be fitted in a through hole provided in the core metal of the spoke portion of the steering wheel. In this case, the shape and size of each switching member are liable to a restriction. Moreover, the provision of a large through hole in the core metal of the spoke portion presents such a problem that the mechanical strength of the spoke portion will be largely deteriorated.

In the case of the latter, the switching member on the front side and the switching member on the back side are separately secured on the core metal of the spoke portion of the steering wheel, and there is no fear of lowering the degree of design freedom and deteriorating the strength of the spoke portion. In this case, however, it becomes necessary to perform, in a narrow space on the back side of the steering wheel, the electrical connection of both switching members by the wiring harness after installing them on the spoke portion, resulting in a deteriorated facility of installation.

SUMMARY OF THE INVENTION

In view of the above-described problems inherent in the heretofore known arts, it is an object of this invention to provide a switching unit for a motor vehicle steering wheel which facilitates mechanical and electrical connection of the switching members both on the front and back sides, with little restriction to their shape and without deterioration of the strength of the spoke portion of the steering wheel.

The above-described object of this invention is accomplished by the following constitution. That is, the switching unit fixedly installed on the spoke portion of the motor vehicle steering wheel is provided with a switching member on the front side and a switching member on the back side which are mutually mechanically and electrically connected when mounted on the spoke portion. Electrode portions are located in opposite positions of the switching members. One of these electrode portions is an elastic electrode portion which elastically deforms. In the integrated form of these switching members, the elastic electrode portion as one electrode portion deforms into elastic contact with the other electrode portion.

According to the switching unit of such a constitution, there is no need to integrate the switching member on the front side and the switching member on the back side prior to installation to the steering wheel; therefore, the switching unit is little restricted in shape and size and has a high degree of design freedom. Furthermore, in the mechanically integrated switching members, the elastic electrode portion comes into elastic contact with the other electrode portion, thereby making electrical connection. Therefore, it is possible to dispense with such a complicated operation that the switching members are electrically connected by a wiring harness after installation to the steering wheel. Furthermore, since there is no need to form a through hole in the spoke portion of the steering wheel for installing the switching unit, the switching unit will not decrease in mechanical strength.

On addition to the constitution stated above, if the switching members on both the front and back sides are designed to be integrated by snap fitting, the switching members can easily be integrally mounted on both sides of the spoke portion, to thereby largely improve the facility of installation.

DESCRIPTION OF THE PREFERRED EMBODIMENTS

Figure 1:
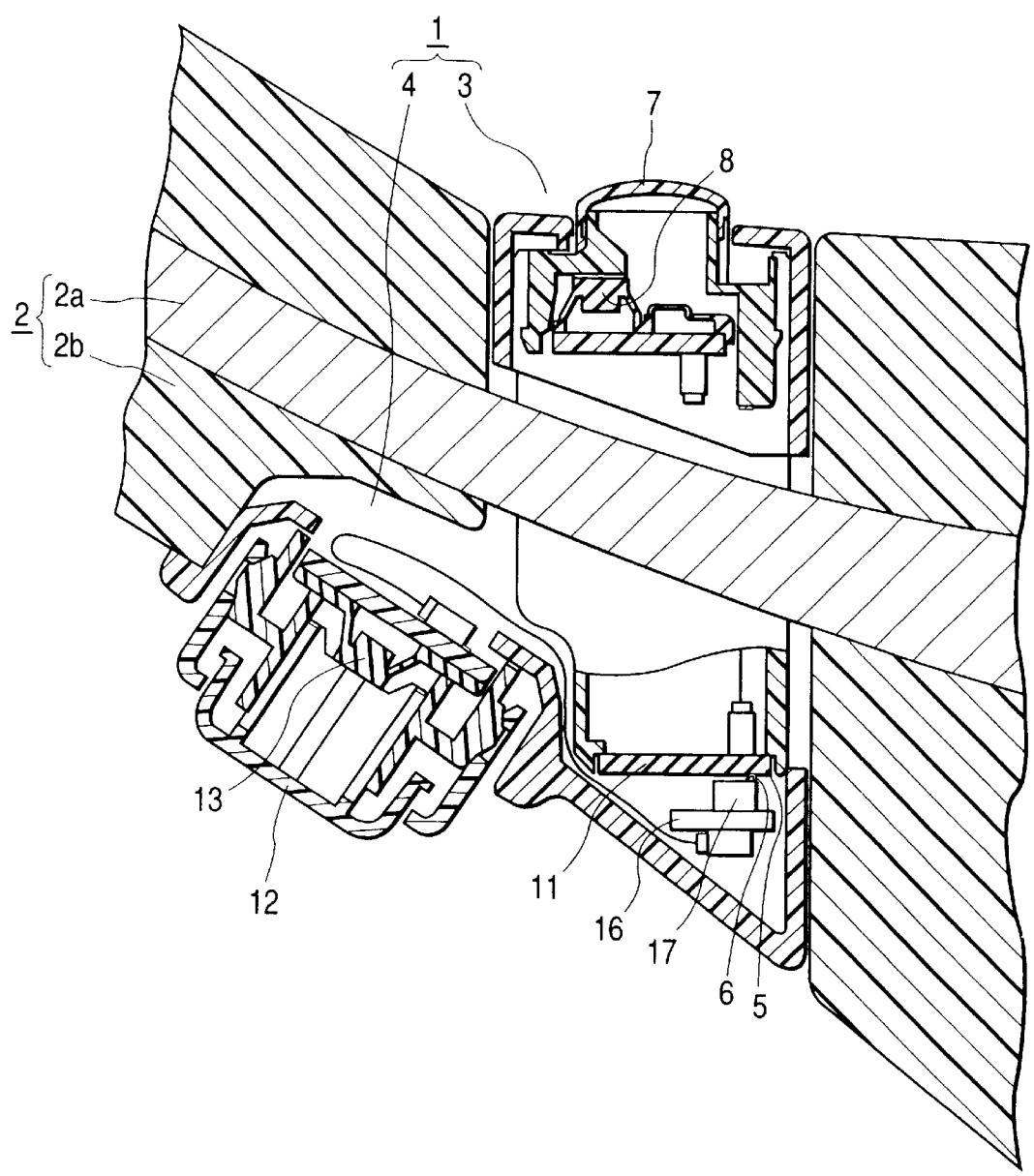
FIG. 1 is a sectional view showing a switching unit pertaining to the present embodiment mounted on the spoke portion of a steering wheel.
Figure 2:
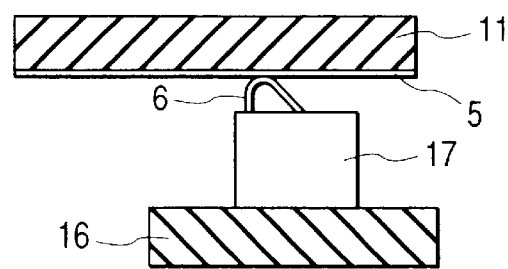
FIG. 2 is an explanatory view of a major portion of FIG. 1 showing the position of electrical connection of both switching members.
Figure 3:
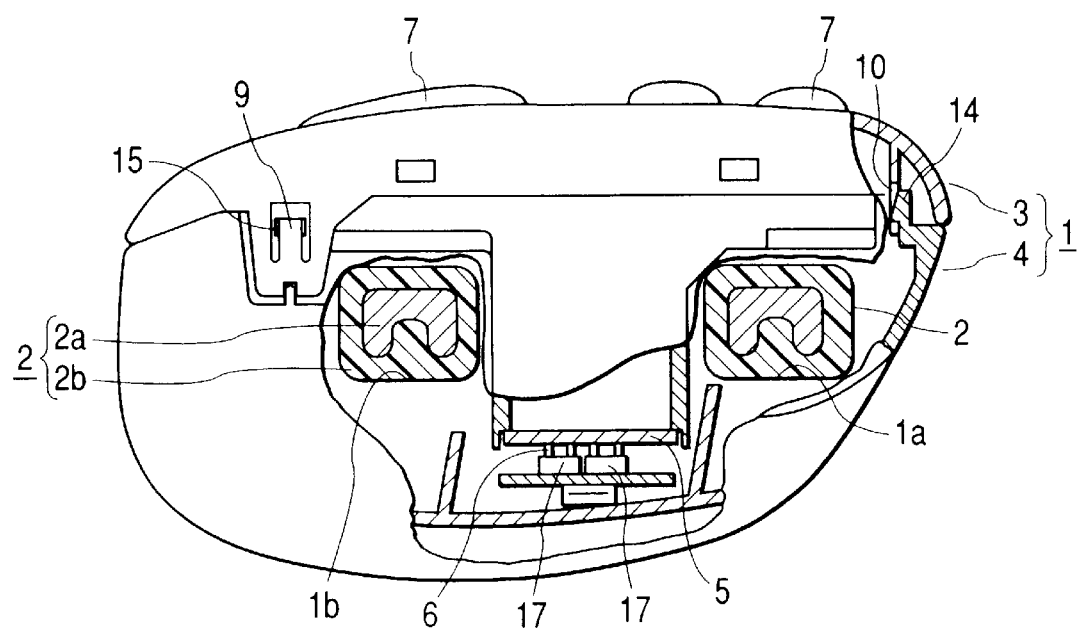
FIG. 3 is a side view, partly sectioned, showing the outside appearance of the switching unit after installation.
Figure 4:
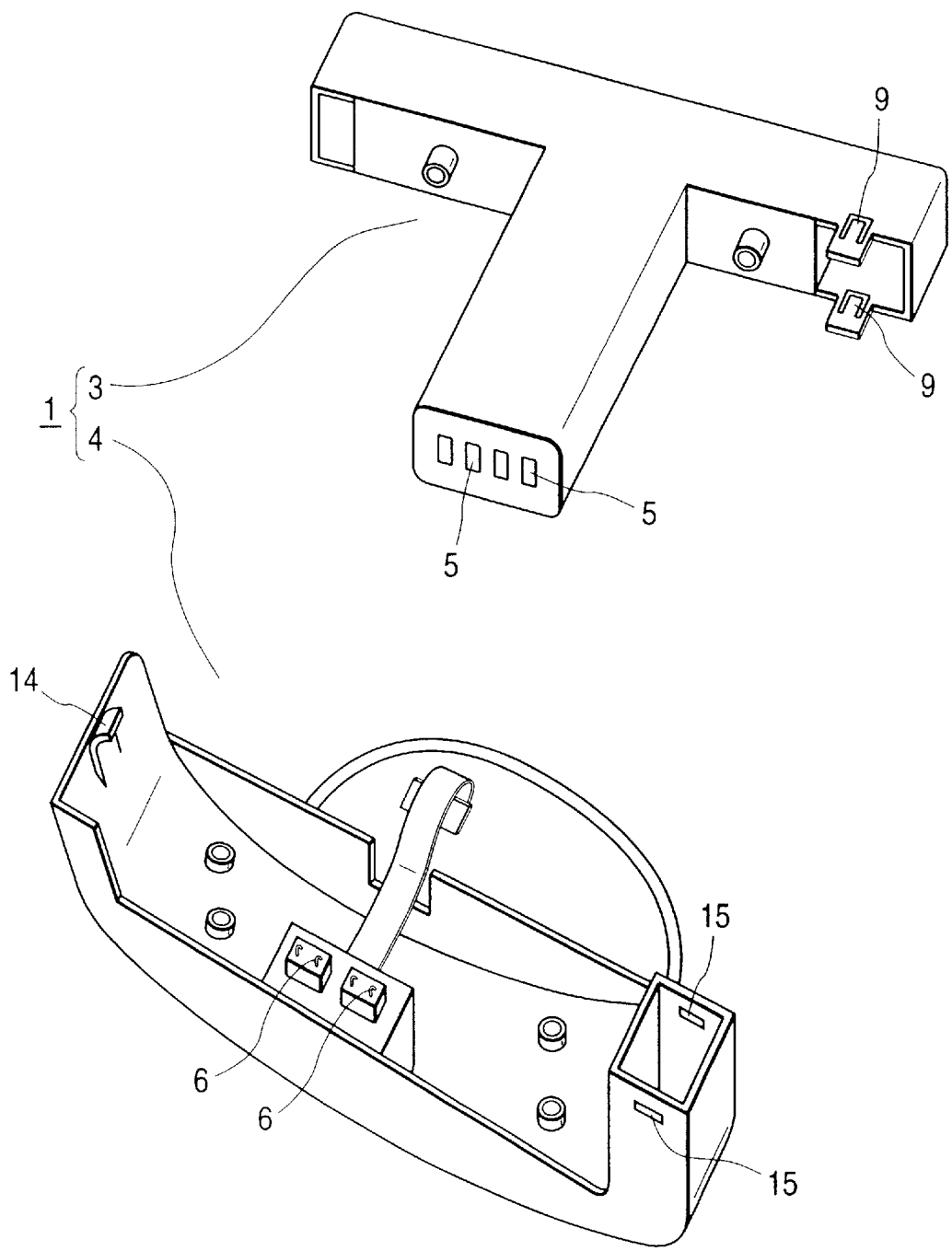
FIG. 4 is an exploded perspective view of the switching unit.

Referring to FIGS. 1 to 4, a switching unit for a steering wheel according to one embodiment of this invention will be described. FIG. 1 is a sectional view showing the switching unit according to the present invention mounted on the spoke portion of the steering wheel. FIG. 2 is an explanatory view of a major portion of FIG. 1 showing the position of electrical connection of both switching members. FIG. 3 is a partly sectioned side view showing the outside appearance of the switching unit after installation. FIG. 4 is an exploded perspective view of the switching unit.

The switching unit 1 for the steering wheel shown in these drawings is fixedly attached on two spoke portions 2 of the automobile steering wheel, and is comprised of a switching member 3 on the front side and a switching member 4 on the back side. As shown in FIG. 3, there are formed through holes 1*a* and 1*b* through the two spoke portions 2 by combining the switching members 3 and 4. Here, the spoke portion 2 is a part connecting the central part of the steering wheel at which an air back device is stored, to an annular ring portion forming the outer periphery of the steering wheel. In the present embodiment will be explained the switching unit 1 which is applied to a steering wheel having four spoke portions 2, on two of which the switching unit 1 is installed.

The switching member 3 on the front side and the switching member 4 on the back side of the switching unit 1 are provided with an electrode portion pattern portion 5 and an elastic electrode portion 6 respectively in opposite sections. That is, the switching member 3 on the front side is provided with an operating button 7 which is pushed to operate, a switching element 8 having a click rubber and a contact, a snap pawl 9 and a pawl inserting hole 10 for snap fitting, and an electrode portion pattern portion 5 formed on the printed circuit board 11; the electrode portion pattern portion 5 being exposed at one end portion of the switching member 3 on the front side. On the other hand, the switching member 4 on the back side is provided with an operating button 12 which is pushed to operate, a switching element 13 having a click rubber and a contact, a snap pawl 14 and a pawl inserting hole 15 for snap fitting, and an elastic electrode portion 6 including an elastic metal piece formed projecting on an electronic part 17 mounted on a printed circuit board 16. The elastic electrode portion 6 is exposed at one end portion of the switching member 4 on the back side. Then, when the switching member 3 on the front side and the switching member 4 on the back side are mutually pressed to the spoke portion 2 of the steering wheel, the snap pawl 9 engages in the pawl inserting hole 15 while the snap pawl 14 engages in the pawl inserting hole 10 as shown in FIG. 3. Therefore, the switching members 3 and 4 are mechanically integrated into a switching unit 1 as mounted on the spoke portion 2. Also when the switching members 3 and 4 are thus integrated, the elastic electrode portion 6 of the switching member 4 on the back side elastically contacts the electrode portion pattern portion 5 of the switching member 3 on the front side. In this state, therefore, the switching members 3 and 4 are electrically connected.

The spoke portion 2 has a core metal 2*a* made of an aluminum alloy or other and covered with a covering body 2*b* of synthetic resin. The switching unit 1, though not illustrated, is securely fixed on the core metal 2*a* by attaching by screws a part of the switching member 4 on the back side to the core metal 2*a* of the spoke portion 2.

The switching unit 1 described above is designed to be mechanically and electrically connected when the switching member 3 on the front side and the switching member 4 on the back side are installed on the spoke portion 2 of the steering wheel. It is therefore unnecessary to assemble the switching members 3 and 4 into one unit prior to installation. The switching unit 1, which can be installed in a split condition to the spoke portion 2, is not so much restricted in the shape and size of the switching members 3 and 4, thereby insuring a high degree of design freedom. The switching unit 1, therefore, is applicable to various kinds of operating switches and accordingly usable as a multifunctional switching device.

Furthermore, the switching unit 1 is of such a design that, when the switching members 3 and 4 are mechanically assembled into one unit, one elastic electrode portion 6 is brought into elastic contact with the electrode portion pattern portion 5 on the opposite side to electrically connect these switching members 3 and 4. There is therefore no necessity to electrically connect the switching members 3 and 4 by a wiring harness after installation on the spoke portion 2 of the steering wheel. That is, the switching members 3 and 4 require no complicated wiring operation for electrical connection within a narrow space on the back side of the steering wheel. The switching unit 1, therefore, has an outstanding facility of installation. In addition, in the case of the switching unit 1, the switching member 3 on the front side and the switching member 4 on the back side are provided with the snap pawls 9 and 14, so that the switching members 3 and 4 can easily be assembled into one unit by snap fitting, thereby insuring very high facility of installation.

In the switching unit 1, the elastic electrode portion 6 consisting of an elastic metal piece can reliably be held in elastic contact with the electrode portion pattern portion 5 although there exists a little difference in relative positions between the electrode portion pattern portion 5 and the elastic electrode portion 6 because of a dimensional error of component parts. Therefore, although no wiring harness is used, the switching members 3 and 4 have a high degree of reliability in electrical connection. Besides, since the switching unit 1 needs no through hole to be provided in the core metal 2*a* of the spoke portion 2 for fitting the switching members 3 and 4, the core metal 2*a* will not be deteriorated in mechanical strength.

It will be understood that, in the above-described embodiment, the elastic electrode portion 6 is provided in the switching member 4 on the back side, and may be provided in the switching member 3 on the front side. In the embodiment, the switching member 4 on the back side is screwed to the core metal 2*a* in order to securely fix the switching unit 1 on the core metal 2*a* of the spoke portion 2, but the switching member 3 on the front side may be screwed to the core metal 2*a*. Furthermore, in the embodiment described above, the switching unit 1 is attached to two spoke portions 2, but may be attached to one spoke portion 2.

The switching unit of this invention is provided with the switching member on the front side and the switching member on the back side which are mutually connected mechanically and electrically when attached on the spoke portion. When these switching members are integrally assembled, the elastic electrode portion on one side comes into elastic contact with the electrode portion on the other side, and therefore it is unnecessary to assemble these switching members into one unit prior to installation to the steering wheel, thereby enhancing the degree of design freedom with little restriction to shape and size and besides dispensing with such a complicated operation as electrically connecting the switching members by a wiring harness after installation to the steering wheel. That is, the ease of installation can be improved. Furthermore, because no through hole is needed for installation of the switching unit on the spoke portion of the steering wheel, there is no fear of deteriorating the mechanical strength of the steering wheel.

Furthermore, in the switching unit of this invention, the electrode portion in which the elastic electrode portion is in elastic contact is constituted of an electrode portion pattern formed on a printed circuit board; therefore the electrode portions can readily be made, thereby enabling reduction of the cost of the switching unit.

Furthermore, according to this invention, the switching members on the front and back sides are assembled into one unit by snap fitting, and therefore it is possible to further facilitate installation operation.

Furthermore, according to this invention, at least one of the switching members on the front and back sides is attached by screws to the spoke portion of the steering wheel, and therefore the switching unit can be firmly attached on the spoke portion.

What is claimed is:

1. A switching unit fixedly installed on a spoke portion of a steering wheel in a motor vehicle, comprising: a first switching member on a front side of the steering wheel and a second switching member on a back side of the steering wheel which are mutually mechanically and electrically connected together when mounted on the spoke portion; the first and second switching members having electrode portions in opposite positions, one of the electrode portions being an elastic electrode portion which elastically deforms; and the elastic electrode portion on one side deforming into elastic contact with the electrode portion on an other side when the first and second switching members are in an integrated form.

2. A switching unit according to claim 1, wherein the electrode portion with which the elastic electrode portion is in elastic contact is an electrode pattern formed on a printed circuit board.

3. A switching unit according to claim 1, wherein the first switching member on the front side and the second switching member on the back side are assembled into one unit by snap fitting.

4. A switching unit according to claim 1, wherein at least one of the first switching member on the front side and the second switching member on the back side is attached by screws to the spoke portion of the steering wheel.

* * * * *